United States Patent [19]

Yahraus

[11] 4,073,550

[45] Feb. 14, 1978

[54] SLEEVE BEARING

[75] Inventor: William A. Yahraus, Mentor, Ohio

[73] Assignee: Gould Inc., Rolling Meadows, Ill.

[21] Appl. No.: 690,193

[22] Filed: May 26, 1976

[51] Int. Cl.$^2$ .............................................. F16C 9/04
[52] U.S. Cl. ...................................... 308/23; 308/167; 308/179
[58] Field of Search ............. 308/23, 167, 179, 237 R

[56] References Cited

U.S. PATENT DOCUMENTS

| 2,553,935 | 5/1951 | Parks et al. | 308/23 |
| 3,390,925 | 7/1968 | Fangman | 308/23 |

FOREIGN PATENT DOCUMENTS

| 2,359,634 | 6/1975 | Germany | 308/179 |

Primary Examiner—Richard A. Bertsch
Attorney, Agent, or Firm—Russell E. Baumann; Edward E. Sachs

[57] ABSTRACT

A sleeve bearing of the halfshell type wherein an oil film is disposed between the bearing and journaled member during operation and which bearing improves bearing fatigue resistance. The thickness of one of the halfshells is increased to thereby reduce the radius of curvature thereof and the thickness of the other halfshell is reduced by an equal amount to thereby increase the radius of curvature thereof. The halfshells are disposed so as to closely surround a journaled member in a manner such that the higher loads generated during bearing cycling are carried by the halfshell having the greater thickness. This structure acts to reduce destructive oil film pressures developed between the bearing and journaled member during that period of bearing cycling when elevated loads are experienced.

13 Claims, 3 Drawing Figures

U.S. Patent  Feb. 14, 1978  4,073,550
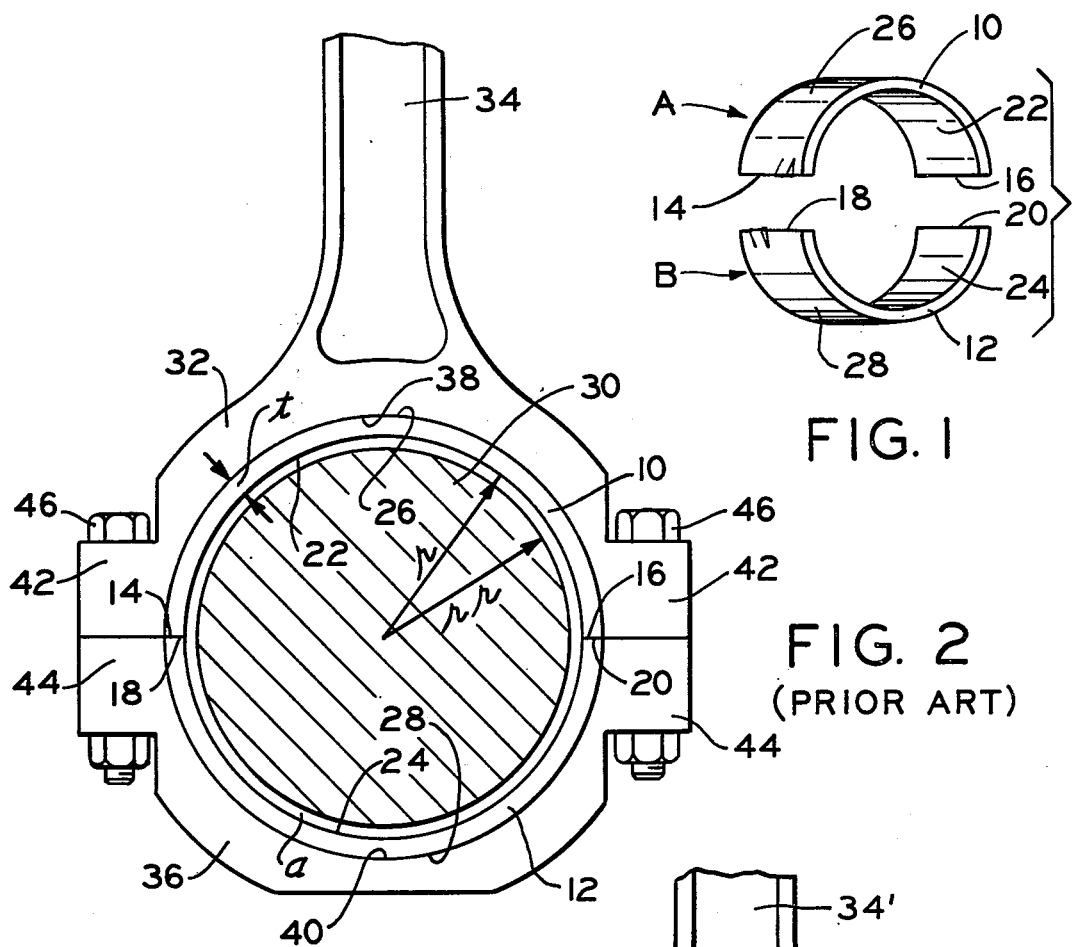
FIG. 1
FIG. 2 (PRIOR ART)
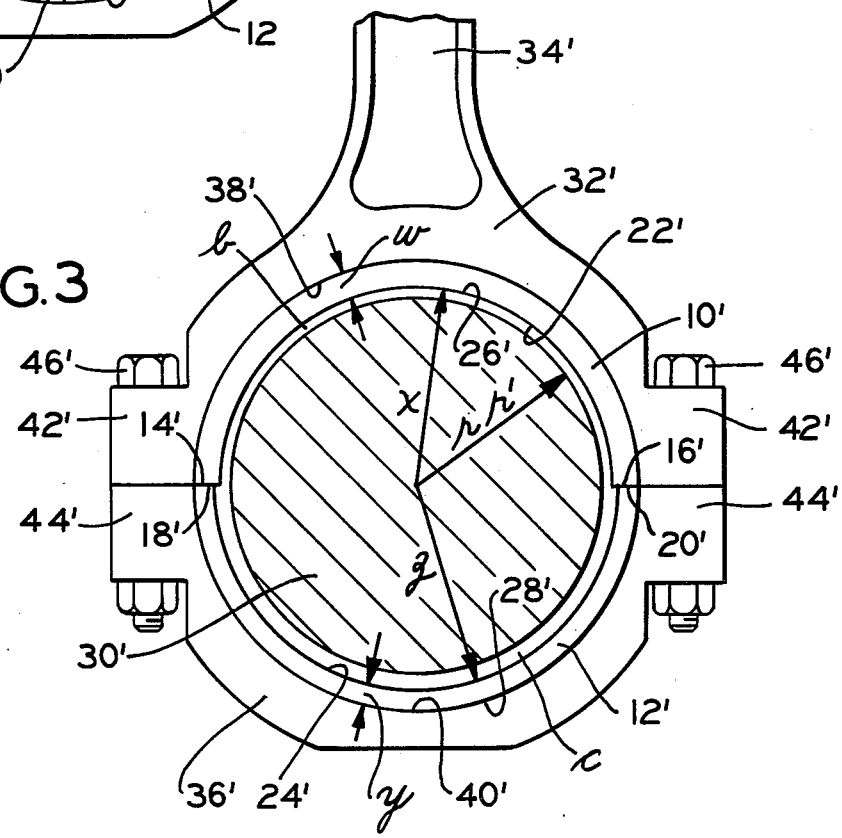
FIG. 3

SLEEVE BEARING

BACKGROUND OF THE INVENTION

This invention pertains to the art of bearings and more particularly to bearings of the type having an oil film or layer disposed between the bearing surface and a journaled member.

The invention is particularly applicable to halfshell bearings used in internal combustion engines in cooperation with crankshafts and connecting rods and will be described with particular reference thereto. However, it will be appreciated by those skilled in the art that the invention has broader applications and may be used in many other environments of this general type.

As is known, internal combustion engine main and connection rod bearings are subjected to repetitive loads which can ultimately fatigue the bearing alloy if it does not have sufficient strength for the particular applications involved. Metallurgical advances through the years have produced progressively stronger alloys, however, those metallurgical alterations and advances which have thus far been made appear to have reached the limit insofar as improving or increasing fatigue resistance. The primary reason for this is that in order to make an alloy stronger, it must be made harder or alloyed with higher percentages of elements which are not, themselves, good bearing materials. Bearings constructed from bearing materials which are made stronger by either of the two above noted means will, while theoretically having a higher fatique strength, have a much greater tendency to seize during operation and will invariably fail from such seizure.

Typical internal combustion engine main and connecting rod bearings are comprised of halfshells or semi-circular arrangements constructed from conventional bearing materials and are installed within the engines in a manner well known in the art. Because these particular engine components are received in what amounts to continuously circulated oil bath, there is a clearance area provided between the outer peripheral surface of the journaled member or crankshaft and the inner peripheral surface of the bearing. This arrangement not only facilitates relative rotation between the parts in the proper manner during normal engine operation but more importantly, facilitates the creation of an oil film therebetween which acts as a load supporting medium during engine operation. The hydrodynamic wedge effect which causes the shaft or journaled member to float on an oil film is a result of there being a difference between shaft and bearing radii at the associated areas thereof.

For some period of time, it was believed in the industry that fatigue of a bearing alloy could be expressed in terms of maximum unit load (peak load divided by projected bearing area, i.e., length x shaft diameter). However, this belief or concept did not satisfactorily explain why bearings with the same area, but different lengths and diameters, exhibited different fatigue lives under identical loading. Modern analytical methods, specifically the journal orbit analysis, have now explained this phenomenon. Basically, geometric factors such as bearing length, diameter and clearance affect the peak pressure developed in the load supporting oil film. Those bearings exposed to higher pressures fatigue sooner or to a greater extent in the same amount of time as bearings exposed to lower pressures.

Through the use of bearing orbit analysis techniques, it can be shown that the peak oil film pressure developed in a bearing increases in an essentially linear fashion with increased bearing clearance. Thus, a seemingly ready answer for improving fatigue strength for these bearings is to reduce the oil film pressures by simply reducing the bearing clearance. However, a simple reduction in such clearance is not generally preferred since it would reduce the "slop" between the bearings and journaled member and thus be more sensitive to misalignments. Moreover, such a reduction in clearance would also cause the bearing to run hotter than one of normal clearance and it could, therefore, burn up during normal use.

The subject invention contemplates a new structural arrangement which overcomes all of the above referred to problems and others and provides a new bearing structure which is simple in design, provides improved fatigue resistance over conventional bearing structures and which is readily adaptable to use in a number of environments.

BRIEF DESCRIPTION OF THE INVENTION

In accordance with the present invention, there is provided a new and improved cylindrical sleeve bearing adapted to be operably associated in a close spaced surrounding relationship with a journaled member having a substantially constant radius of curvative $rr$ over the circumference thereof. The new and improved bearing includes a first portion having a thickness $w$ and a radius of curvature $x$ which is greater than the radius of curvature $rr$ of the journaled member. The bearing structure also includes a second portion having a thickness $y$ which is less than thickness $w$ and a radius of curvature $z$ which is greater than the radius of curvature $x$ of the first portion. By means of this structure, the first portion of the bearing will "see" a journaled member radius more nearly equal its own radius during the high load portion of the bearing cycle so that a lower oil film pressure will develop. The second portion of the bearing is disposed in a manner so that it will receive oil film pressure during the low load portion of the bearing cycle.

In accordance with another aspect of the present invention, the first portion of the bearing comprises one-half of the circumference of the generally cylindrical bearing area and the second portion comprises the other half of the bearing area.

In accordance with another aspect of the present invention, the bearing area is defined by a pair of bearing halfshells with one of the halves comprising the first portion and the other of the halves comprising the second portion.

In accordance with yet another aspect of the present invention, the thickness $w$ and radius of curvature $x$ of the first portion and the thickness $y$ and radius of curvature $z$ of the second portion vary from each other substantially equal to and opposite from a mean bearing thickness and radius of curvature.

The principal object of the present invention is a provision of a new and improved sleeve bearing which increases fatigue resistance.

Another object of the present invention is the provision of a new and improved sleeve bearing which is simple in design.

Another object of the present invention is the provision of a new and improved sleeve bearing which utilizes conventional bearing components and materials.

A further object of the present invention is the provision of a new and improved sleeve bearing which is readily adapted to use in any number of environments of the type wherein an oil film is provided between the cooperating bearing and the journaled member surfaces.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and herein:

FIG. 1 is a perspective view of a halfshell bearing arrangement to which the subject invention is particularly adapted for use;

FIG. 2 is a front elevational view in partial cross-section showing a conventional prior art halfshell bearing arrangement as installed in a typical internal combustion engine environment; and, FIG. 3 is a view similar to FIG. 2 showing the concepts of the subject invention as incorporated into a connecting rod bearing for an internal combustion engine.

DESCRIPTION OF THE PREFERRED EMBODIMENT

Referring now to the drawings wherein the showings are for purposes of illustrating the preferred embodiment of the invention only and not for the purposes of limiting the same, the FIGURES show a pair of halfshell bearings A and B of the type normally employed on, for example, internal combustion engine main and connecting rod bearings.

Halfshell bearing A is comprised of a band-like semi-circular body 10 and halfshell B is comprised of a band-like semi-circular body 12. Body 10 has end faces 14, 16 and body 12 has end faces 18, 20. Bodies 10, 12 are dimensioned and configured so that end faces 14, 18 and 16, 20 will substantially mate with each other. Bodies 10, 12 also include inner bearing surfaces or areas 22, 24 and outer surfaces 26, 28 respectively. These halfshell bearings may, of course, be constructed from conventional bearing materials in any conventional manner. For internal combustion engine usage such as that to which the subject invention is particularly directed, materials such as, but not limited to, lead base babbitt, aluminum alloys and copper-lead alloys are employed for the inner bearing surfaces or areas 22, 24 of bodies 10, 12.

With reference to FIG. 2, description will hereinafter be made to a prior art connecting rod bearing employing the bearing halfshells shown in FIG. 1. Here, the crankshaft or journaled member is shown in cross-section and generally designated by numeral 30. The shaft is substantially circular in cross section and is shown as having a radius rr at the outer peripheral surface thereof.

The connecting rod bearing is comprised of halfshell bearings A and B is disposed in a closely spaced relationship with crankshaft or journaled member 30. To provide the desired bearing installation, an upper rod bearing housing 32 which includes connecting rod 34 as an integral part thereof is provided along with a cooperating lower rod bearing housing 36. Each housing has a generally semi-circular opening adapted to closely receive bodies 10, 12. Specifically, housing 32 includes a semi-circular receiving or mounting surface 38 adapted to closely receive outer bearing surface 26 of body 10 and lower rod bearing housing 36 includes a semi-circular receiving or mounting surface 40 adapted to closely receive outer surface 28 of body 12.

Moreover, housing 32 includes a pair of outwardly extending flanges 42 and housing 36 includes a pair of similar connecting flanges 44 with flanges 42, 44 dimensioned and located so as to mate with each other. The housings are rigidly connected together by means of threaded fasteners 46 in a conventional manner. Bodies 10, 12 are received in housings 32, 36 in the manner shown in FIG. 2 with substantially mating ends 14, 18 and 16, 20 in an abutting relationship with each other. Housings 32, 36 and bodies 10, 12 are dimensioned so that this abutting area is in substantial alignment with the parting line or line of separation between the housings themselves at flanges 42, 44. Bodies 10, 12 are retained in the housings by the dimensioned relationship between the components when the housings are tightly connected together by means of fasteners 46 and the bodies typically and advantageously include small tabs or lips as shown in FIG. 1 for purposes of assuring proper alignment between them. The structure described with reference to FIG. 2 is deemed conventional and is well known in the art so that further elaboration on the specifics thereof noted above is deemed unnecessary.

As shown in FIG. 2 in an exaggerated form, an annular clearance area $a$ is provided between the outer peripheral surface of crankshaft or journaled member 30 and inner bearing surfaces 22, 24 of halfshell bearing bodies 10, 12. In practical application, this clearance is fairly small and may only comprise a few thousandths of an inch. The size of the clearance will vary depending upon the specific application of the bearing within an internal combustion engine as well as the characteristics of the engine design itself. Also in the prior art, both halfshell bearing bodies 10, 12 have had a substantially identical thickness designated $t$ in FIG. 2 and this thickness may vary from a few hundredths of an inch to a tenth of an inch or so. With this substantially constant thickness, a radius of curvature $r$ is defined from the center of the bearing outwardly to bearing surfaces 22, 24. Because of clearance area $a$, radius $r$ will be greater than radius $rr$. In order to facilitate ease of understanding the spacial relationship between the components radii $r$ and $rr$ are shown as being coaxial. In actual practice, however, and due to machining characteristics and tolerances encountered during component manufacture, the centers for the bearing and crankshaft radii may be slightly offset relative to each other involving some eccentric relationship between the components. This relationship does not, however, have any effect on the concepts of the subject invention as described herein.

During operation of an engine which incorporates the prior art connecting rod arrangement shown in FIG. 2, oil is received in annular clearance area $a$ forming an oil film. This film has a hydrodynamic wedge effect which causes shaft 30 to float on the oil film during engine operation and bearing cycling. During such cycling, the oil film pressure which has a destructive effect on halfshell bearing bodies 10, 12 at bearing surfaces 22, 24 is particularly troublesome during the upstroke of the connecting rod and through the cylinder bore. It is during this portion of the cycle, i.e., when crankshaft or journaled member 30 is acting against the oil film disposed between that member and inner bearing surface 22 of halfshell body 10 that the peak or maximum oil film pressures are developed. While there are oil film pressures developed between the crankshaft and inner bearing surface 24 of halfshell body 12 during the downstroke, such pressures are not nearly as great or destructive as those incurred on the upstroke.

Thus, and in a typical internal combustion engine environment, the crankshaft bearings are differentially loaded during each cycle and such loading is dependent upon the position of the bearing during the cycle. When the rod bearings are subjected to repetitive loads such as those described above, it can ultimately fatigue the bearing alloy if the alloy does not have sufficient strength for the application involved. Accordingly, it has been described to improve this fatigue strength in order to yield better overall engine operation.

It has been thought that simple metallurgical improvements to bearing materials would solve this problem. However, in order to make a bearing alloy stronger, it must necessarily be hardened or be alloyed with higher percentages of elements which are not themselves good bearing materials. When these solutions are employed, the bearings, while theoretically having a higher fatigue strength, also have a much greater tendency to seize during operation.

Knowing that a decrease in clearance area $a$ would act to reduce peak oil film pressure developed during bearing cycling, another apparent solution to the problems would be simply reduce the clearance area itself. Such a reduction in clearance is not generally preferred or desirable since the elimination of some "slop" within the bearing arrangement will render it far more sensitive to misalignment. Moreover, such a bearing arrangement would run hotter than one of normal clearance and could burn up during normal use.

The subject invention focuses on a solution to the above noted problems as shown in FIG. 3. The structural solution is shown as it has been incorporated into a conventional rod bearing arrangement identical to the arrangement shown in FIG. 2. For this reason and for ease in appreciating the scope of the invention, like components are identified by like numerals with the inclusion of a primed (') suffix while new components are identified by new numerals or letter designations.

Basically, the concepts of the present invention are directed toward increasing bearing fatigue resistance and still maintaining the same overall diametral bearing clearance as has been conventionally employed in order to prevent seizures or excessive operating temperatures. The desired results are achieved by specific modifications made to halfshell bearing bodies 10, 12. More particularly and in accordance with the present invention, the desired results are obtained by increasing the bearing wall thickness in the heavily loaded of the halfshells by a given amount and by decreasing the bearing wall thickness of the lightly loaded of the halfshells by an equal amount. In this manner, the bearing will "see" or be associated with a crankshaft or journaled member radius more nearly equal to its own radius during the high load portion of the cycle. This arrangement results in a lower peak film pressure being developed there than with conventional bearing structures such as that shown and described with reference to FIG. 2.

With reference to FIG. 3, bearing body 10' has a thickness $w$ and bearing body 12' has a thickness $y$. Thickness $w$ is greater than the thickness $t$ of the conventional arrangement shown in FIG. 2 and thickness $y$ is less than the thickness $t$. In order to prevent seizures or excessive temperatures when utilizing the concepts of the subject invention, the increase in thickness $w$ over thickness $t$ is compensated for by a corresponding identical decrease in thickness $y$ under thickness $t$. Thus, it is possible to maintain the same overall diametral clearance as is used in the present conventional bearings while still achieving better overall operational results insofar as increasing fatigue resistance.

By increasing the thickness of halfshell bearing body 10' to thickness $w$, the effective radius of curvature $x$ of body 10' is decreased slightly from radius $r$ shown in FIG. 2, although radius $x$ is still greater than radius $rr'$ of crankshaft or journaled member 30'. In FIG. 3, the clearance area between inner bearing surface 22' and the outer peripheral surface of crankshaft 30' is designated $b$ and is smaller than clearance area $a$ of FIG. 2. Moreover, and due to the decrease of thickness $y$ in FIG. 3, radius of curvature $z$ of halfshell bearing body 12' is increased so that it is greater than the radius of curvature $x$ and the radius of curvature $r$. Accordingly, a clearance area $c$ is defined between inner bearing surface 24' and the outer peripheral surface of crankshaft 30' and which clearance area is larger than clearance area $a$ in FIG. 2 as well as clearance area $b$ in FIG. 3.

With the structural arrangement disclosed above with reference to FIG. 3, during the upstroke of the piston when the greatest peak oil film pressures are developed, the destructive forces normally attendant thereto over long periods of time or operation under heavy loads are decreased due to the decrease in the clearance area $b$. Again, as bearing clearance increases, the peak oil film pressures developed increase in an essentially linear manner so that conversely, a decrease in bearing clearance causes a decrease in peak oil film pressures. Furthermore, since lower oil film pressures are developed in the downstroke portion of the cycle, the corresponding increase in clearance area $c$ will not be significant insofar as any destruction of lower halfshell bearing 12' during cycling.

The various dimensions and clearances shown in FIG. 3 have been exaggerated for purposes of appreciating the scope and intent of the present invention. In actuality and with some typical internal combustion engines, the increase in thickness $w$ of body 10' may only be on the order and magnitude of 0.001 inch with a corresponding identical reduction in thickness $y$ of body 12'. While these changes may seem minimal from a structural point of view, the arrangement shown in FIG. 3 does provide increased bearing fatigue resistance over the conventional prior art arrangement shown in FIG. 2. By way of example and based upon the results of a series of calculations based upon a diesel engine rod bearing, an increase in the upper halfshell bearing wall thickness of 0.001 inch with a corresponding reduction in the lower halfshell bearing wall thickness resulted in a reduction in peak oil film pressures of approximately 35%.

While the subject invention has been described with specific reference to adaptation and use on a connecting rod bearing, it should also be appreciated that the invention has been equally adapted for use on the engine main bearings. When adapted for use on main bearings, however, the thicker walled halfshells are employed on the lower main bearing positions with the thinner halfshells being employed in the upper main bearing positions. The subject invention is also adaptable to use in other environments and installations where bearing fatigue resistance is a problem and where an oil film is disposed between the bearing and the journaled member to provide a hydrodynamic wedge effect thus developing peak oil film pressures during cycling which could have a destructive effect on the bearings themselves.

The invention has been described with reference to the preferred embodiment. Obviously modifications and alterations will occur to others upon the reading and understanding of this specification. It is my intention to include all such modifications and alterations insofar as they come within the scope of the appended claims or the equivalents thereof.

Having thus described my invention, I now claim:

1. In a bearing of the type having a substantially cylindrical bearing area with inner and outer surfaces which surrounds a substantially cylindrical journaled member in a close spaced relationship therewith in a manner defining a clearance area between the inner surface of said bearing area and the outer peripheral surface of said journaled member adapted to receive a load supporting oil film, said bearing area being defined by a bearing material having a substantially constant radial thickness $t$ throughout and wherein said bearing area has a substantially constant radius of curvature $r$ at said inner surface with said journaled member having a substantially constant radius of curvature $rr$ at the outer peripheral surface thereof slightly less than radius $r$ and wherein said bearing is subjected to differential loading during cycling, the improvement comprising:

a first circumferential portion of said bearing area having a thickness slightly greater than $t$ so as to reduce the radius of curvature of said inner surface to less than $r$ but greater than $rr$; and, a second circumferential portion of said bearing area opposed from said first portion having a thickness slightly less than $t$ so as to increase the radius of curvature of said inner surface to greater than $r$.

2. The improvement as defined in claim 1 wherein said first portion comprises one half of the circumference of said generally cylindrical bearing area and said second portion comprises the other half of the circumference of said bearing area.

3. The improvement as defined in claim 2 wherein said bearing area is defined by a pair of opposed semi-cylindrical halfshells, one of said halfshells comprising said first portion and the other of said halfshells comprising said second portion.

4. The improvement as defined in claim 1 wherein said bearing area is defined by a bearing sleeve, said first portion being operably disposed relative to said journaled member to receive the highest forces incurred during said differential loading with said second portion being operably disposed relative to said journaled member to receive the lower forces incurred during said differential loading.

5. The improvement as defined in claim 4 wherein said sleeve is comprised of two opposed semi-cylindrical bearing halfshells, one of said halfshells comprising said first portion and the other of said halfshells comprising said second portion.

6. The improvement as defined in claim 1 wherein the increase in thickness and resultant decrease in the radius of curvature of said first portion are substantially equal to and opposite from the decrease in thickness and resultant increase in the radius of curvature of said second portion.

7. A cylindrical sleeve bearing having inner and outer surfaces adapted to be operably associated in a close spaced surrounding relationship with a cylindrical journaled member in a manner defining a clearance area between the inner surface of said bearing and the outer surface of said journaled member adapted to receive a load supporting oil film with said journaled member having a radius $rr$ at the outer peripheral surface thereof, said bearing comprising:

a first portion having a radius of curvature $x$ to said inner surface which is greater than the radius of curvature $rr$; and, a second portion having a radius of curvature $z$ to said inner surface which is greater than said radius of curvature $x$.

8. The bearing as defined in claim 7 wherein said first portion comprises one-half of the circumference of said generally cylindrical sleeve bearing and said second portion comprises the other half of said sleeve bearing.

9. The bearing as defined in claim 8 wherein said sleeve bearing is comprised of a pair of opposed semi-cylindrical bearing halfshells, one of said halfshells comprising said first portion and the other of said halfshells comprising said second portion.

10. The bearing as defined in claim 7 wherein said first portion is adapted to be operably disposed relative to said journaled member to receive the higher forces incurred during differential loading of said bearing and said second portion is adapted to be operably disposed relative to said journaled member to receive the lower forces incurred during said differential loading.

11. The bearing as defined in claim 10 wherein said sleeve is comprised of two opposed semi-cylindrical bearing halfshells, one of said halfshells comprising said first portion and the other of said halfshells comprising said second portion.

12. The bearing as defined in claim 7 wherein said first portion has a radial thickness $w$ and said second portion has a radial thickness $y$, said thickness $w$ being greater than said thickness $y$.

13. The bearing as defined in claim 12 wherein said thickness $w$ and radius of curvature $x$ of said first portion and said thickness $y$ and radius of curvature $z$ of said second portion vary substantially equal to and opposite from each other relative to a mean bearing thickness and radius of curvature.

* * * * *